Patented Dec. 2, 1930

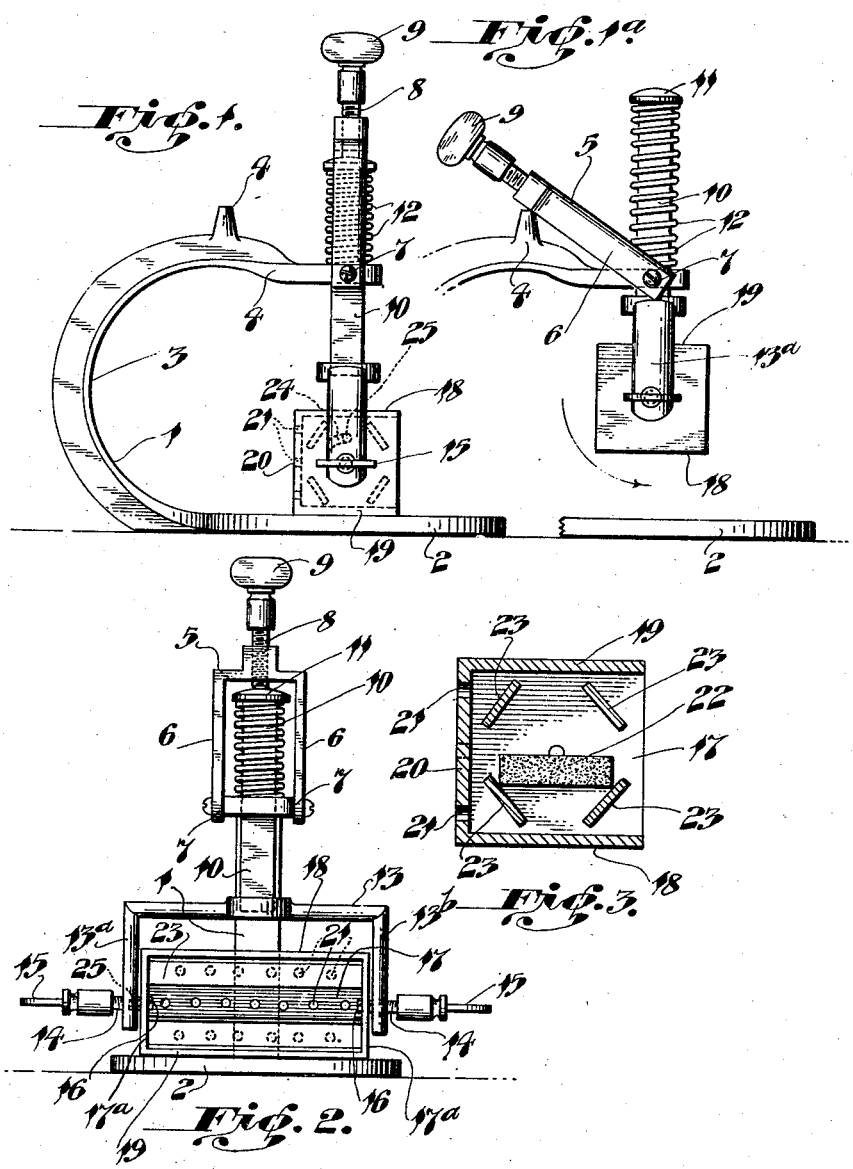

1,783,894

UNITED STATES PATENT OFFICE

JAMES DOUGLAS VOSS, OF OAKLEIGH, NEAR MELBOURNE, VICTORIA, AUSTRALIA

VULCANIZING APPLIANCE

Application filed July 12, 1928, Serial No. 292,287, and in Australia March 19, 1928.

This invention relates to a vulcanizing appliance and has been devised in order to provide an appliance for applying rubber patches to tyres and other articles in a cheap, simple and effective manner.

Various methods have been adopted for accomplishing this object and a popular method comprises the use of a device having a slow burning non-flaming heating material, or a combination of such slow burning material in a pan on the underside of which is arranged the patch to be vulcanized to an article.

This invention is not directed to the use of a slow burning non-flaming heating material nor to a pad of such material in a pan but is directed to the use of a quick burning inflammable charge adapted to heat the top surface of a receiver, said receiver when the said top surface is sufficiently heated being reversed by suitable means to allow of its application with pressure to a patch or other surface on an article such as a motor or like tyre which is to be vulcanized.

The essential features embodied in the invention are as follows:—

1. The use of a heating chamber, the top surface of which receives heat from a heating element disposed therein and means combined with the chamber adapted to reverse the chamber and to apply the heated surface with pressure to a patch to be vulcanized.

2. Means so that when the chamber is reversed for the operation of vulcanizing the opposite surface of the chamber receives heat from the heating element to allow of the immediate further use of the appliance for vulcanizing purposes.

In order that the invention may be more readily understood it will now be described with reference to the accompanying drawings in which:—

Figures 1 and 1a are side elevations of the improved vulcanizing appliance, the heating chamber in Figure 1 being in position for vulcanizing a patch, while in Figure 1a the heating chamber is in its raised inoperative position.

Figure 2 is a view in front elevation of Figure 1.

Figure 3 is a view in cross section of the heating chamber of the appliance.

According to this invention a bracket 1 with a flat base 2 to support the article to be patched or vulcanized is provided, the bracket being suitably arched as at 3 and returned parallel with the support 2, being formed with a projection 4 which supports the controlling arm 5 as illustrated in Figure 1a when the appliance is in inoperative position.

This controlling arm 5 is bifurcated as at 6 and is pivoted to the bracket 1 at 7, being also fitted with a pressure adjusting screw 8 formed with a finger piece 9.

Vertically sliding in the portion 4 of the bracket 1 is a rod 10 formed with a head 11 and surrounded by a spring 12, the rod 11 below the portion 4 of the bracket 1 connecting or being formed with a stirrup 13, the legs 13a, 13b of which are fitted with pins 14 rotatably mounted thereto, each pin 14 being fitted with a finger piece 15 for the purpose of rotating or partially rotating the heating chamber 17 supported thereby and to bring the heating surfaces of the chamber into position for vulcanizing.

The inner ends 16 of these pins screw into the end walls 17a and support a heating chamber 17 which is arranged so that it rotates with the pins when they are operated by the hand and so that the chamber 17 can be reversed to allow either of the surfaces 18 or 19 to be presented to the article to be vulcanized on the portion 2 of the bracket 1.

The heating chamber 17 at the wall 20 is formed with perforations 21 or openings to allow of sufficient draught for the burning charge 22 disposed therein, the charge on the reverse of the chamber 17 being retained in the said chamber by the diagonally disposed plates 23 arranged internally of the chamber as illustrated in Figures 1, 2 and 3.

In order to guide the chamber 17 in its rotating motion, the inside of one or both of the legs 13a, 13b, may be formed with an arcuate groove 24 forming a path for a projection or notch 25 on the end wall or walls of the chamber 17.

The essential feature of the invention therefore consists of a heating chamber 17 with two operative vulcanizing or heating surfaces 18, 19 and which can be reversed to contact with pressure with the article to be vulcanized, the one heating surface receiving heat while the other having been heated carries on the process of vulcanizing.

In practice the burning charge 22 is placed in the chamber 17 which is in the position shown in Figure 1a and the flame from the charge heats the surface 19.

When sufficiently heated the surface 19 is brought to the underside by partly rotating the chamber 17 and pressure is applied to the head 11 of the rod 10 which is forced down against the pressure of the spring 12 and carrying the chamber down the heated surface 19 is brought into contact so that it will vulcanize the article on the portion 2 of the bracket 1.

The arm 5 is then brought into vertical position over the head 11 of the rod 10 and pressure is maintained by the screwing down of the screw 8 on the head 11.

Simultaneously the other surface 18 of the chamber 17 is receiving heat from the burning charge 22.

When the article has been sufficiently cooked to ensure vulcanization, the screw 8 is released from the head 11 and the arm 5 is thrown back on its rest 4, the rod 10 carrying the chamber 17 returns as illustrated in Figure 1a and when the chamber is reversed and pressed down again presents the surface 18 as the heater to the article to be vulcanized and so on as required to vulcanize an extensive surface of one article or several portions of different articles continuously.

I desire it to be understood that any suitable improvements and modifications may be embodied without departing from the spirit and scope of the invention, the essential features of which are above described.

What I claim as my invention and desire to secure by Letters Patent is:—

1. A vulcanizing appliance consisting in the combination of a bracket provided with parallel extensions, an arm pivoted to the said bracket, an adjusting screw fitted to the said arm, a spring controlled rod slidable in the said bracket, a stirrup at the lower end of the rod and a heating chamber pivotally supported in the stirrup in such a manner that it can be reversed to present a plurality of heated surfaces to the article to be vulcanized substantially as described.

2. A vulcanizing appliance comprising a bracket or frame supporting the article to be vulcanized and also supporting a sliding member carrying a heating chamber, the heating chamber being pivotally supported on the sliding member.

3. In a vulcanizing chamber, a heating chamber provided with a plurality of heating surfaces adapted for operation in turn, the combination therewith of a vertically sliding member under spring control adapted to carry the heated surface of the chamber into contact with the article to be vulcanized, and means operable at will for reversing the heating surfaces, the spring automatically returning the chamber on release of the pressure thereon.

4. In a vulcanizing chamber a heating chamber provided with a plurality of heating surfaces adapted for operation in turn, the combination therewith of a sliding member under spring control adapted to carry the heated surface of the chamber into contact with the article to be vulcanized, means operable at will for reversing the heating surfaces, and a pivoted arm fitted with an adjusting screw adapted to maintain the spring controlled rod and consequently the heating chamber at pressure during the contact of the heating chamber with the article being vulcanized.

5. A vulcanizing appliance comprising a heating chamber, a base therefor, the said heating chamber being adapted for vulcanizing operations and being so mounted on the said base that while one surface of the heating chamber is effecting a vulcanizing operation, the other surface is being heated for further vulcanizing operations, means for heating the said chamber, means for holding the said chamber in intimate contact with the material to be vulcanized, and means for normally holding the heating chamber clear of the base.

6. A vulcanizing appliance comprising means for supporting the article to be vulcanized, means for supporting a heating chamber having a plurality of heating surfaces, said heating chamber being pivotally mounted for the purpose of reversing the said heated surface or surfaces thereof, and means for transposing the heated surface or surfaces into contact with the article to be vulcanized.

7. In a vulcanizing appliance, a heating chamber provided with a plurality of heating surfaces and walls diagonally disposed within the heating chamber to retain a burning charge within the said chamber irrespective of the position of the heating chamber.

Signed at Melbourne, Victoria, Australia.

JAMES DOUGLAS VOSS.